United States Patent [19]

Sigouin et al.

[11] Patent Number: 4,793,389

[45] Date of Patent: Dec. 27, 1988

[54] TREE HARVESTER

[75] Inventors: Roger Sigouin, 601 R 111 ouest, Amos, Quebec, Canada, J9J 2Y1; Michel St Pierre, Amos, Canada

[73] Assignee: Roger Sigouin, Amos, Canada

[21] Appl. No.: 96,151

[22] Filed: Sep. 14, 1987

Related U.S. Application Data

[63] Continuation-in-part of Ser. No. 894,611, Aug. 8, 1986, Pat. No. 4,727,916.

[51] Int. Cl.$^4$ .............................................. A01G 23/08
[52] U.S. Cl. ...................... 144/34 R; 83/613; 83/698; 83/928; 144/3 D; 144/336
[58] Field of Search ............ 144/3 D, 34 R, 336; 30/379.5; 83/613, 638, 698, 928

[56] References Cited

U.S. PATENT DOCUMENTS

| | | | |
|---|---|---|---|
| 3,468,352 | 9/1969 | Larson et al. | 144/3 D |
| 3,707,175 | 12/1972 | Propst | 144/3 D |
| 3,795,264 | 3/1974 | Coughran, Jr. | 144/3 D |
| 3,805,860 | 4/1974 | Smith | 144/3 D |
| 3,875,983 | 4/1975 | Kurelek | 144/3 D |
| 3,910,326 | 10/1975 | Tucek | 144/3 D |
| 4,153,086 | 5/1979 | Oldenburg | 144/3 D |
| 4,540,033 | 9/1985 | Wehr et al. | |

FOREIGN PATENT DOCUMENTS

| | | |
|---|---|---|
| 1059408 | 7/1979 | Canada . |
| 1135599 | 11/1982 | Canada . |
| 1140029 | 1/1983 | Canada . |
| 1214976 | 12/1986 | Canada . |
| 938838 | 7/1982 | U.S.S.R. .......................... 144/34 R |

*Primary Examiner*—W. Donald Bray
*Attorney, Agent, or Firm*—Robic, Robic & Associates

[57] ABSTRACT

A tree harvester comprises a head boom at the lower free end of which is mounted a tree felling head having a cylindrical cutting knife behind which is formed a storage enclosure for felled trees. The head includes pivotable gripping arms for pressing the cylindrical knife against the trees to be felled and for moving them and holding them in the storage enclosure.

18 Claims, 11 Drawing Sheets

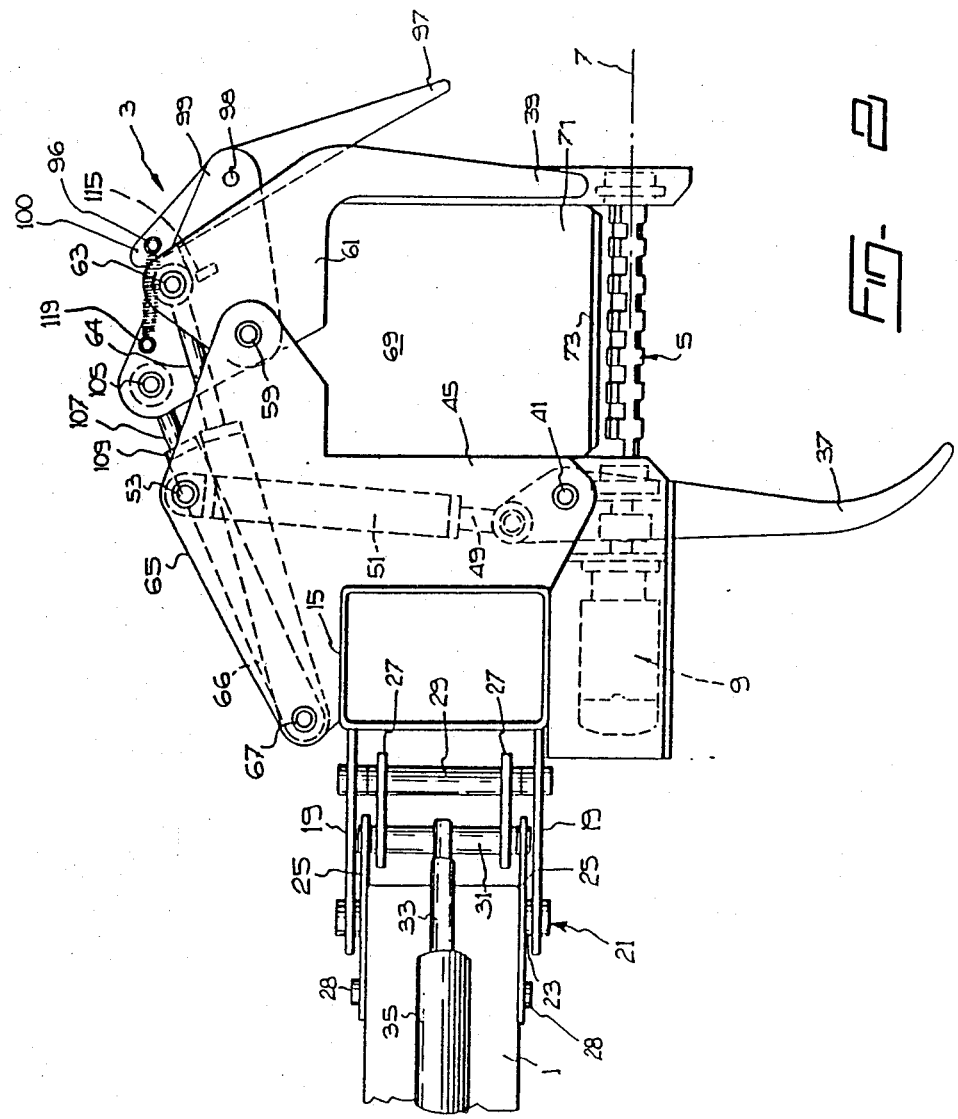

TREE HARVESTER

CROSS REFERENCE TO A RELATED APPLICATION

This application is a continuation-in-part of co-pending application No. 894,611, filed on Aug. 8, 1986, now U.S. Pat. No. 4,727,916.

FIELD OF THE INVENTION

The present invention relates to an improved tree harvester and more specifically to a tree harvester including a new cutting head for felling trees by cutting a groove through their butt ends. It also relates to a method of felling trees with a tree harvester.

DESCRIPTION OF THE PRIOR ART

One known type of cutting head is disclosed in U.S. Pat. Nos. 3,468,352; 3,911,981 and 3,986,542 and involves the use of a pair of shearing blades, adapted to close in around the tree trunk, from both sides of the base of butt end. The power required to achieve the necessary slit, that will cause felling of the tree, is of course quite high, particularly where the butt end is large. The mechanical apparatus necessary to move the shears through the tree is also complex and thus expensive and high in maintenance costs. Another type of harvester using a shear blade is disclosed in U.S. Pat. No. 3,595,288 of July 27, 1971. It also requires much power and the operating costs are high.

In numerous other types of tree harvesters, felling is obtained by making a kerf through the base with an essentially flat large circular saw, as in U.S. Pat. No. 3,659,635 of May 2nd 1972; Canadian Pat. No. 440,992 of Apr. 29, 1947 and Canadian Pat. No. 1,029,283 of Apr. 11, 1978. While the use of a saw requires less operating power and is simpler in construction, the saw itself is a problem because of its bulk and relative frailness resulting from a high diameter to thickness ratio. It must consequently be handled with care both when mounting it on the harvester and when using it as the major portion overhangs its support. Saws are also costly.

Also known is U.S. Pat. No. 3,902,538 which discloses the use of a cylindrical rotary cutter cooperating with a stationary anvil in scissor fashion; the rotary cutter being pivoted at one end to move through a cutting and return angular stroke. Thus, the cylindrical cutter overhangs from its pivoted end which is quite inefficient due to the vibration likely to occur as the cylindrical cutter moves across the tree. Much power is also required for the same reason and the general structure is quite complex.

SUMMARY OF THE INVENTION

The present invention proposes to avoid the above disadvantages by using a cutting tool which is a cylindrical and elongated rotary body formed with cutting teeth or edges. Preferably, these teeth or edges extend parallel to the rotation axis. A cutting tool of this type can be made much sturdier by having an appropriate body diameter. It can be mounted on the head boom more firmly and easily than in the case of circular saws and by means of a simpler structure. The required power is no greater then that required for circular saws.

The invention more specifically provides a method of felling trees with a tree harvester having a head boom and a tree felling head pivotally mounted at the free end of the head boom, the felling head including a platform structure, this method essentially comprising the following steps:

(a) forming, on the platform structure, a felled tree storage enclosure having a flat bottom wall defining a straight edge;

(b) mounting a cylindrical cutting knife solidly on the platform structure immediately adjacent and parallel to the bottom wall straight edge;

(c) moving the platform structure so as to bring the cylindrical cutting knife in essentially horizontal position against the butt end of a tree to be felled;

(d) rotating the cylindrical cutting knife about its longitudinal axis and pressing it against the butt end of the tree to cut a kerf across it and, after the kerf is completed, (e) moving the tree in the storage enclosure.

The method of the invention preferably includes a further step of holding the tree in the storage enclosure and felling and storing additional trees in succession in accordance with the above-mentioned steps (c), (d) and (e).

The invention lies also in the provision of a tree harvester comprising a head boom at the lower end of which is mounted a tree felling head including a cylindrical cutting knife mounted for rotation about its longitudinal axis. Means are additionally provided for mounting the tree felling head at the lower end of the head boom for holding this head with its cutting knife in essentially horizontal position and against one side of a butt end of a tree to be felled. Also, the tree felling head includes gripping arm means that can be pivoted to close in around the butt end of the tree to be felled and on the side thereof opposite the side on which the cutting knife is applied. In this manner, the gripping arm means press the butt end of the tree against the rotary cutting knife and cuts a groove through its butt end for felling the tree. The head also includes wall means located behind the cutting knife with respect to the tree to be felled, such wall means defining a storage enclosure for felled trees. The gripping arm means and the wall means are constructed to allow the arm means to move the felled tree bodily in the storage enclosure and in vertical position. Advantageously, at least one additional gripping arm may be provided which is suitable to hold the stored trees in the storage area while other trees are being felled.

A description now follows of two preferred embodiments of the invention having reference to the appended drawing.

BRIEF DESCRIPTION OF THE DRAWING

FIG. 1 is a perspective view illustrating part of a head boom at the lower end of which is mounted a tree felling head, according to a first embodiment of the invention;

FIG. 2 is a plan view of the tree felling head and the lower end of the head boom;

DESCRIPTION OF THE PREFERRED EMBODIMENTS OF THE INVENTION

Figure 5:
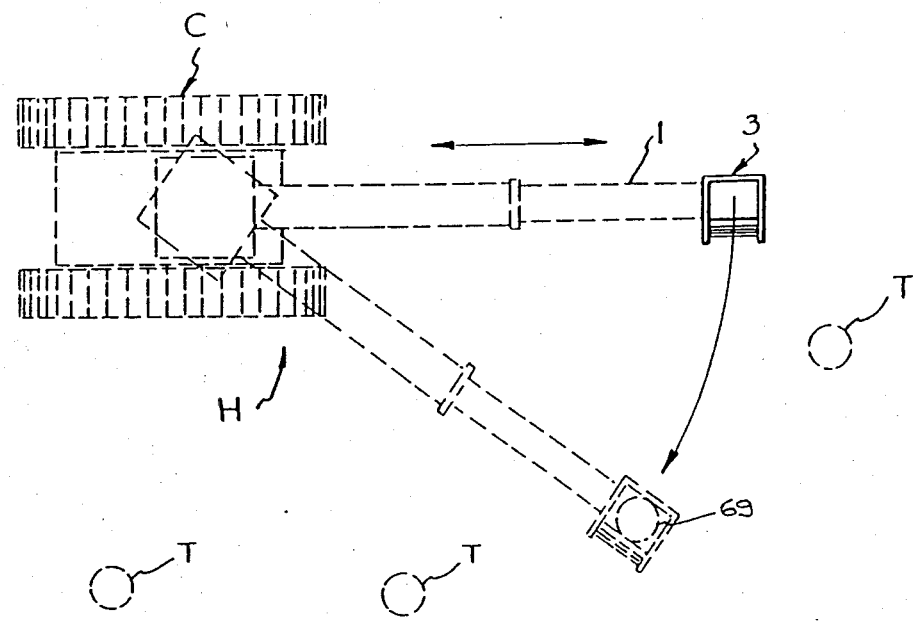
FIG. 5 is a diagrammatic top plan view of a tree harvester according to the invention in use for felling a plurality of trees.
Figure 6:
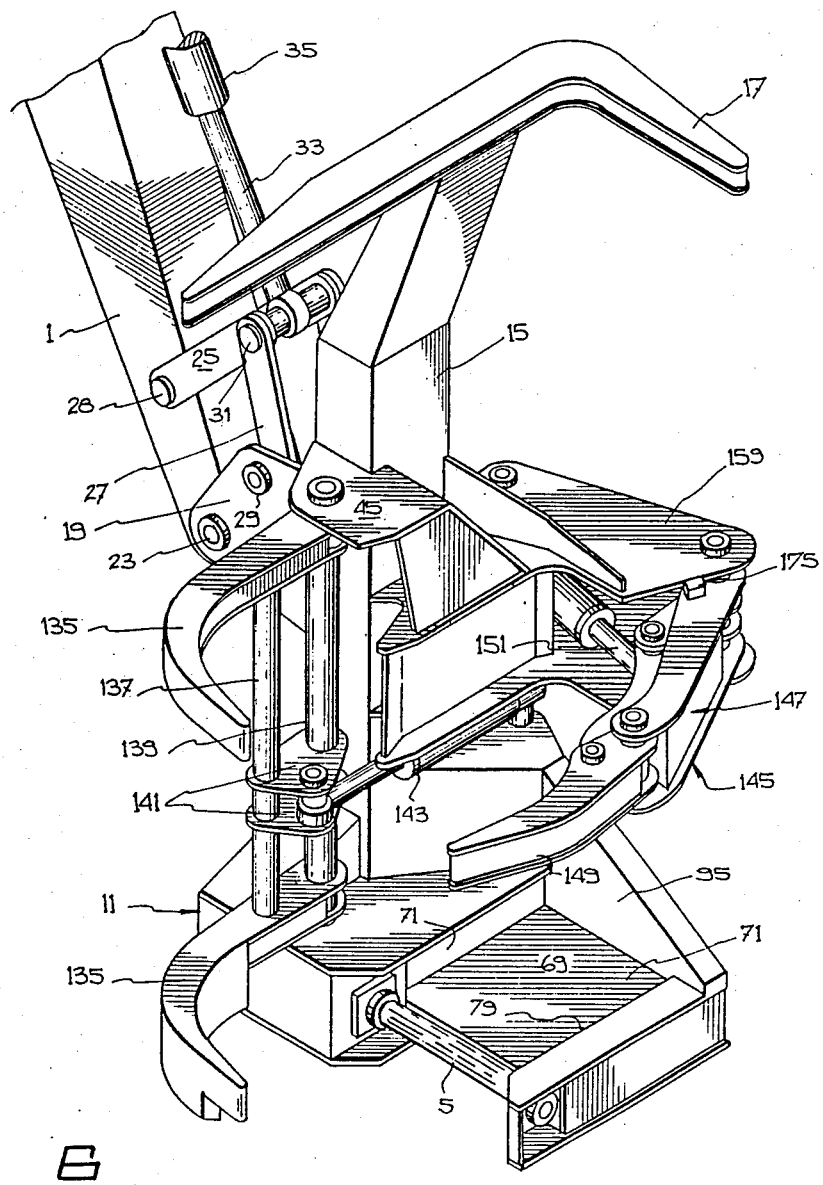
FIG. 6 is a view similar to that of FIG. 1 but according to the second embodiment of the invention.
Figure 7:
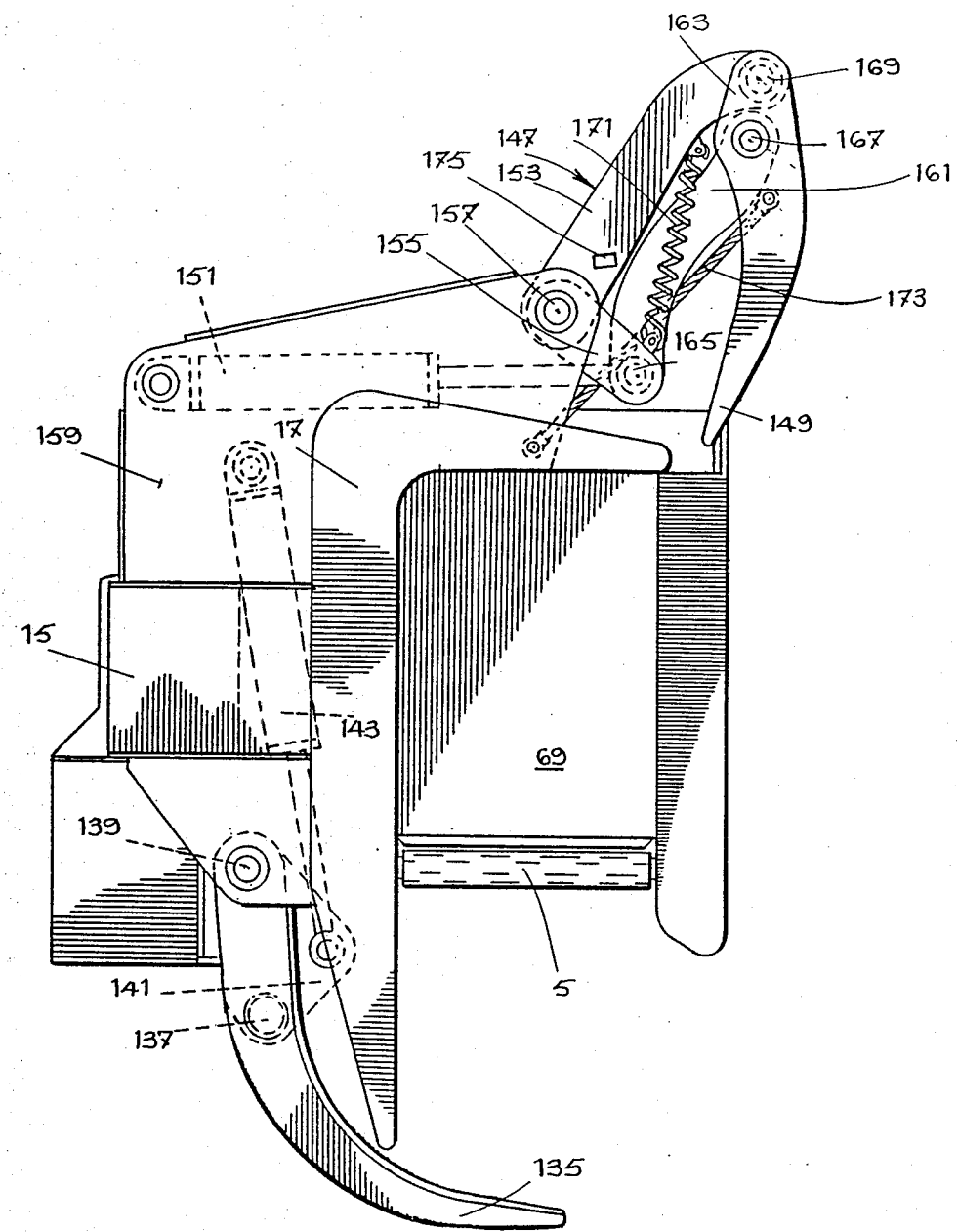

The illustrated tree harvester H (see FIG. 5) made according to the invention, includes a head boom 1 at the lower end of which is pivotally mounted a tree felling head 3 which includes a cylindrical knife 5, to be fully described hereinafter. The knife 5 has a longitudinal axis 7 and a hydraulic power assembly 9 (FIG. 3) is provided in the head 3 for rotating the knife 5 about its axis 7. The head 3 is pivoted to the boom 1 so that the cutting head 5 may be brought in essentially horizontal position whereby it can be placed against one side of a butt end of a tree to be felled.

Figure 3:
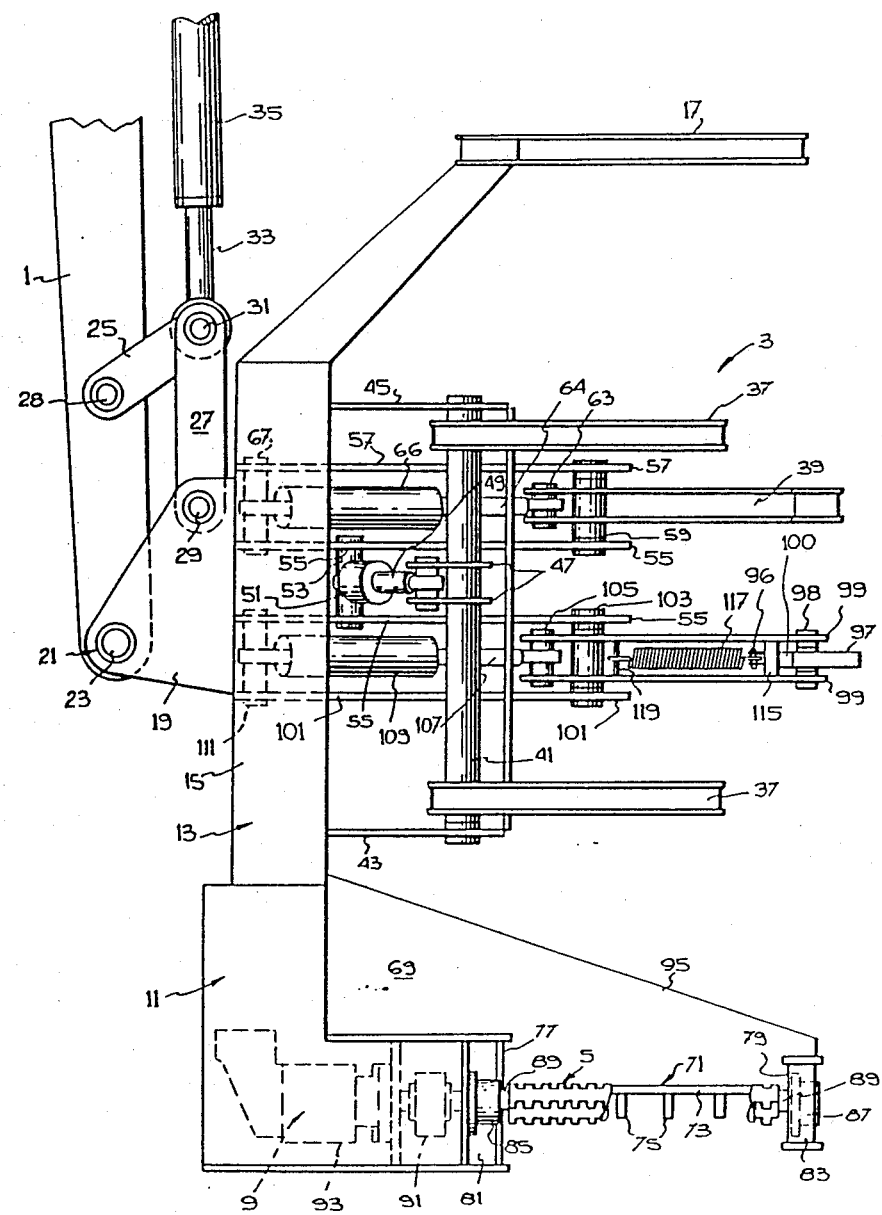
FIG. 3 is a side elevation view, with the cutting knife partly cut away, of the assembly shown in FIG. 1.

The head 1 has a platform structure 11 from a corner of which upstands a columnar structure 13 including a generally hollow post 15 terminating at the upper end by a triangular inclined tree resting support 17. Projecting laterally of the post 15, are a pair of spaced brackets 19, edgedly secured thereto, between which plates 19 and at the outward and thereof is a shaft mount 21 including a pivot 23 serving for pivotally mounting the lower end of the head boom 1 to the spaced brackets 19. Two pairs of links 25, 27, have their distal ends pivotally connected to pivot mounts 28, 29, the former being mounted on the head boom 1 while the latter is mounted between the bracket plates 19. The common ends of the links 25, 27, are, in turn, pivotally interconnected by a shaft 31 of a further shaft mount. A rod 33 of a hydraulic power jack 35 has its free end fixed to the shaft 31. It will thus be appreciated that with the head boom 1 held stationary, actuation of hydraulic cylinder 35 causes pivotal movement of the tree felling head 3 about the pivot 23 at the lower end of the boom 1 and thus angular displacement of the cutting knife 5 which may then be shifted to horizontal position, as shown in FIG. 3, to be applied to and transversely of the butt end of a tree to be felled.

With the cutting knife 5 resting against one side of the tree butt end, clamping means are provided which include first arcuate pivotable gripping arms 37, 39, located above the knife 5 and capable of closing in around the butt end of the tree on the side thereof opposite that against which the knife 5 is applied. With closing pressure applied on the gripping arms 37, 39 the rotary knife 5 is thus brought forcibly against the tree trunk and cuts a groove therethrough until the tree is severed at the base. While two arms 37 are shown, one may be found sufficient, although not as efficient.

The first arcuate gripping arms 37 have one end secured to a common shaft 41 of which the ends are pivoted to two vertically spaced bracket plates 43, 45, edgedly secured as by welding to the post 15. A pair of flat links 47 have one end secured to this shaft 41 while the other end is pivoted to the free end of a rod 49, FIG. 2, of a hydraulic power cylinder 51, the other end of the cylinder 51 being secured to a pin 53 which is itself pivoted to two spaced bracket plates 55, FIG. 3, again edgedly fast with the post 15. It will thus be realized that operation of the power cylinder 51 causes common pivotal movement of the first gripping arms 37 about the axis of their common shaft 41 which, in turn, is parallel to the longitudinal axis of the post 15.

The aforesaid clamping means may include another first gripping arm 39 which is similarly mounted but preferably actuated independently of the other first gripping arms 37. Gripping arm 39 is located opposite arms 37 with respect to the post 15 and also between them as clearly shown in FIGS. 1 and 3. Arm 39 is L-shaped, with one end pivoted to two spaced bracket plates 55, aforesaid, and 57, through a shaft 59. The pivoted end of arm 39 defines a bulge 61 pivoted, through a pin 63, to the free end of a rod 64 of a hydraulic power cylinder 66 of which the other end is pivoted to bracket plate 57 as well as to the upper one of the two bracket plates 55, respectively, through a pin 67. Actuation of the hydraulic power jack 66 thus brings pivotal movement of the first arm 39 about the shaft 59. In this manner, the first arms 37 and 39 are capable of gripping a tree, at the base, and force the rotating knife 5 against it.

The platform structure 11 of the head 3 comprises wall means behind the knife 5, with respect to the tree to be felled, the wall means defining a storage enclosure 69 for trees that have already been felled.

This wall means includes a flat rectangular bottom wall 71 of which the straight frontal edge 73 extends parallel to the axis 7 of the cutting knife 5. This bottom wall 71 may project essentially radially of the knife 5 but it may advantageously have the structure shown at the bottom of FIG. 3 where it stands slightly below the top peripheral edge of the knife 5, being strengthened by transverse metal straight struts 75. It will be noted that the total depth defined by the thickness of the bottom wall 71 and by the width of the struts 75 does not exceed the diameter of the knife. Important however is that the surface of the bottom wall 71 does not exceed the top peripheral edge of the knife 5 to prevent hooking of the end of a cut tree as the latter is moved over into the enclosure 69.

The wall means of the platform structure 11 further includes a circumscribing wall in the form of side wall portions 77, 79, having hollow ends 81, 83 projecting past the frontal edge 73, and transverse wall 95. Suitable bearings 85, 87, are mounted in the hollow ends 81, 83, into which the free ends of the shaft 89 of the knife 5 are journalled. The leftward end of the shaft 89 extends further away from the cutting knife 5 and is operatively coupled to a fly wheel 91 connected, in turn, to a hydraulic motor 93. At their ends away from the cutting knife 5, the side walls 77, 79, are connected by the transverse wall 95 upstanding from the bottom wall 71. Walls 71, 77, 79 and 95 thus define the felled tree storage enclosure 69. The felled tree is drawn into the storage enclosure 69 by the first clamping arms 37, 39, and is held vertically therein. If only one tree can thus be held in enclosure 69, because of its size for instance, the head 3 is immediately transported by the head boom 1 over an attending truck or other vehicle for the felled tree to be unloaded.

For the purpose of holding more than one felled tree in the storage enclosure 69, where feasable, the clamping means aforesaid further comprise at least one second gripping arm 97. This arm 97 is pivoted at 98 between the ends of two spaced actuating levers 99 of which the other ends are pivotally mounted, through a shaft 103, to two spaced plates 55, 101, edgedly secured to the post 15. The levers 99 then extend past the shaft 103 and their free ends are pivotally mounted on a pin 105 which is fixed at the free end of a rod 107 of a hydraulic power cylinder jack 109. The other end of the jack 109 is pivotally mounted, by means of a transverse pin 111, on the two previously mentioned brackets 55, 101, edgedly secured to the post 15. As shown in FIGS. 1, 2 and 3, the second arm 97 has an operating end 100 extending past the pivot 98. This end 100 is drawn toward a limit stop element 115, fixed to and between the two actuating levers 99, by a compression coil spring 117 connected at one end to a pin 96 of the operative end 100 and connected, at the other end, to a short stud 119 which is fixed to and between the levers 99. Element 115 serves to limit the penetration of the second gripping arm 97 into the storage enclosure 69.

Once the felled trees have been brought vertically into the storage area 69 by the first gripping arms 37, 39, the actuating levers 99 are rotated clockwise (FIG. 1) to force the short second arm 97 against the trees to hold them in position on the walls 77, 95, and the resting support 17, the action being enhanced by the force of the compression spring 117. Whenever a new tree is brought into the storage enclosure 69, the second gripping arm 97 is gradually moved away by counterclockwise rotation of the levers 97 thereby loosening the action of the spring 117 and removal from enclosure 69 to allow the first gripping arms 37, 39, to bring the new tree against the other trees that are already in the enclosure 69. Once the new tree abuts the others, the second arm 97 is again brought into action with the force of the coil spring 117 holding all trees in vertical storage position. This particular holding allows the tree harvester H to fell and store a plurality of trees T (see FIG. 5) from a stationary position Indeed, the operator only has to rotate and adjust the length of the boom 1 to <pick up> the tree T all around the carrier C.

Figure 4:
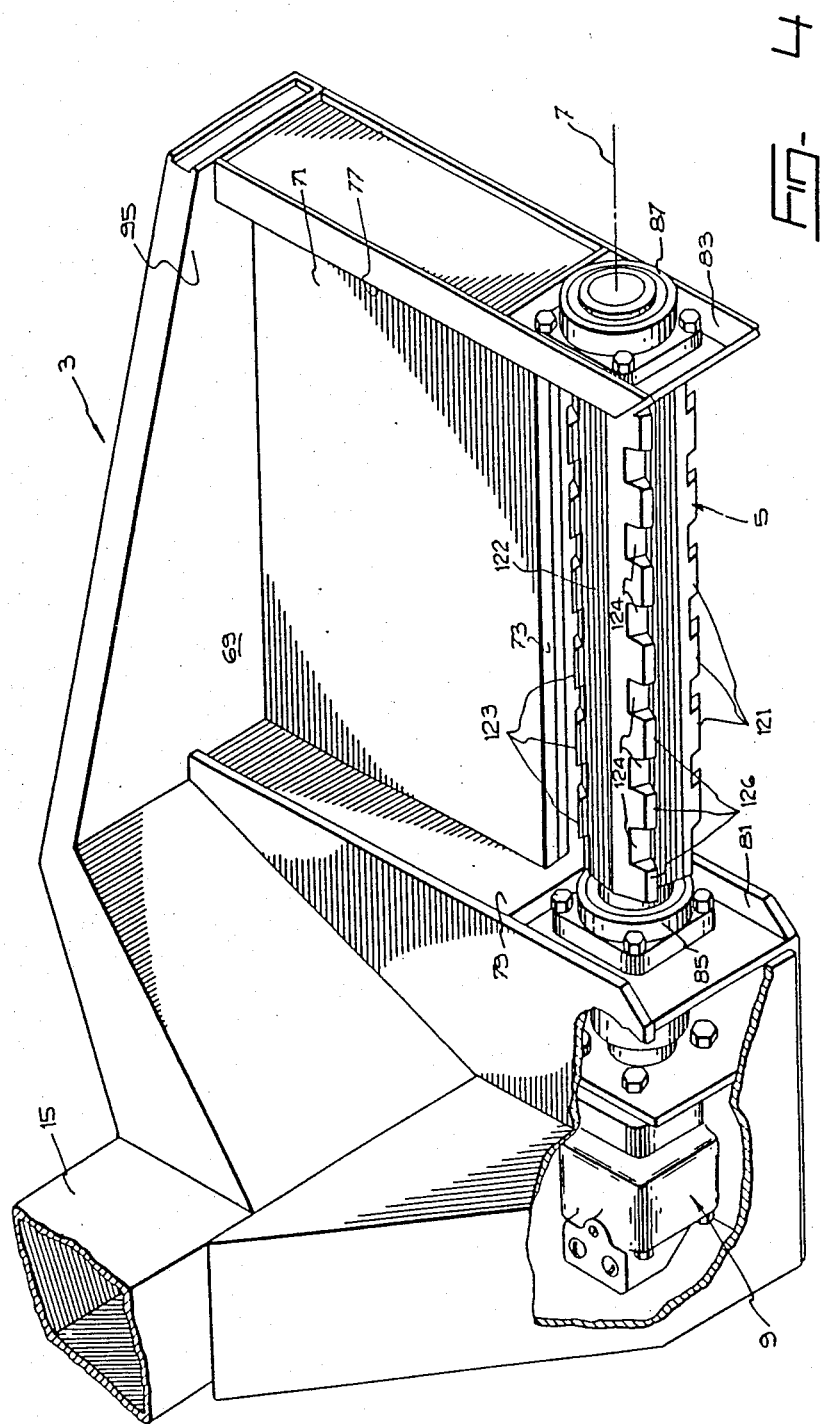
FIG. 4 is a perspective view of the tree felling head alone.

In the preferred form particularly illustrated in FIG. 4, the cutting knife 5 comprises a solid cylindrical body at the periphery of which are formed a plurality of rows 121 of spaced cutting teeth 123 aligned lengthwise of the knife 5; all rows 121 extending parallel to the rotation axis 7 and being evenly spaced around the periphery of the cylindrical knife body. As shown also, the cutting teeth 123 in each row may be staggered with respect to the teeth of adjacent rows, lengthwise of the cutting knife. The cutting teeth 123 may be defined, at the tips of successive longitudinal grooves 122 evenly spaced around the knife 5, by peripheral notches 124; the cutting edges of the teeth 123 being obtained by machining small slightly radially inclined bevels 126. It will however readily come to the mind of those skilled in the art that other types of cutting knife can be used, provided they are of the elongated cylindrical type rotatable about their longitudinal axis.

Reference is now made to FIGS. 6 to 10 for the description of the second embodiment. The same parts are identified by the same reference numerals where like parts are used as in FIGS. 1 to 5.

Figure 8:
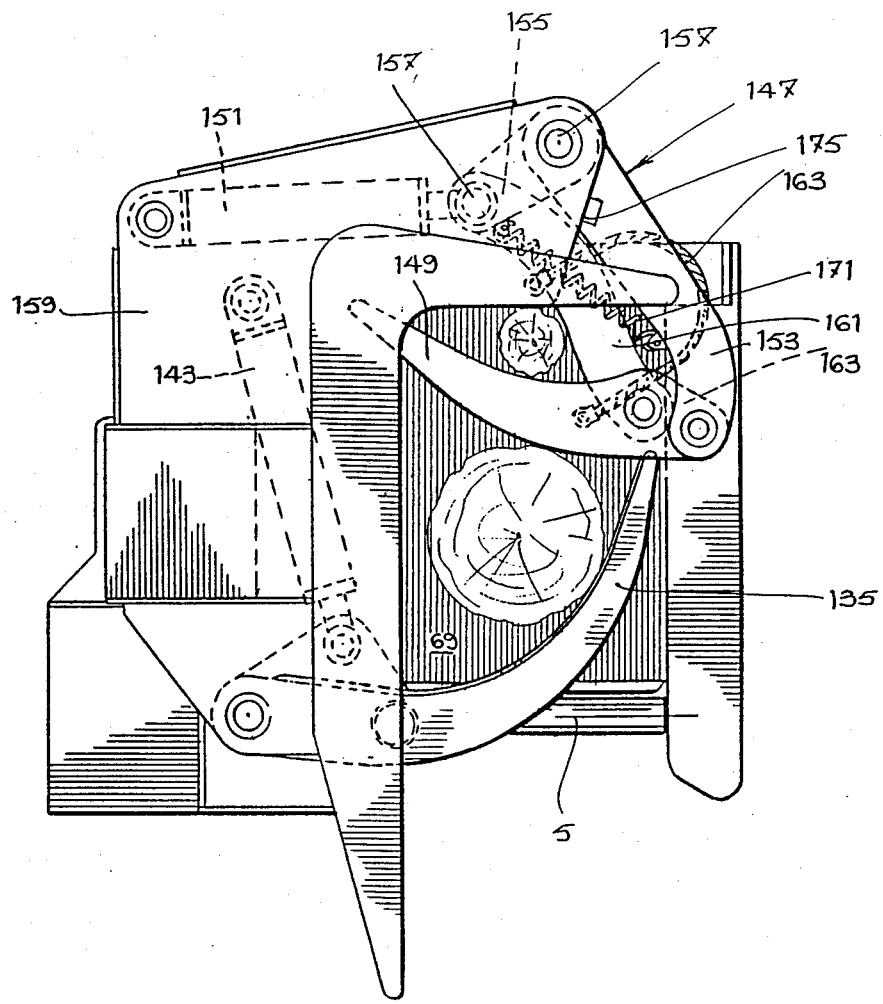
FIGS. 8, 9 and 10 are views like FIG. 7 showing felled trees being fed into the storage enclosure.
Figure 9:
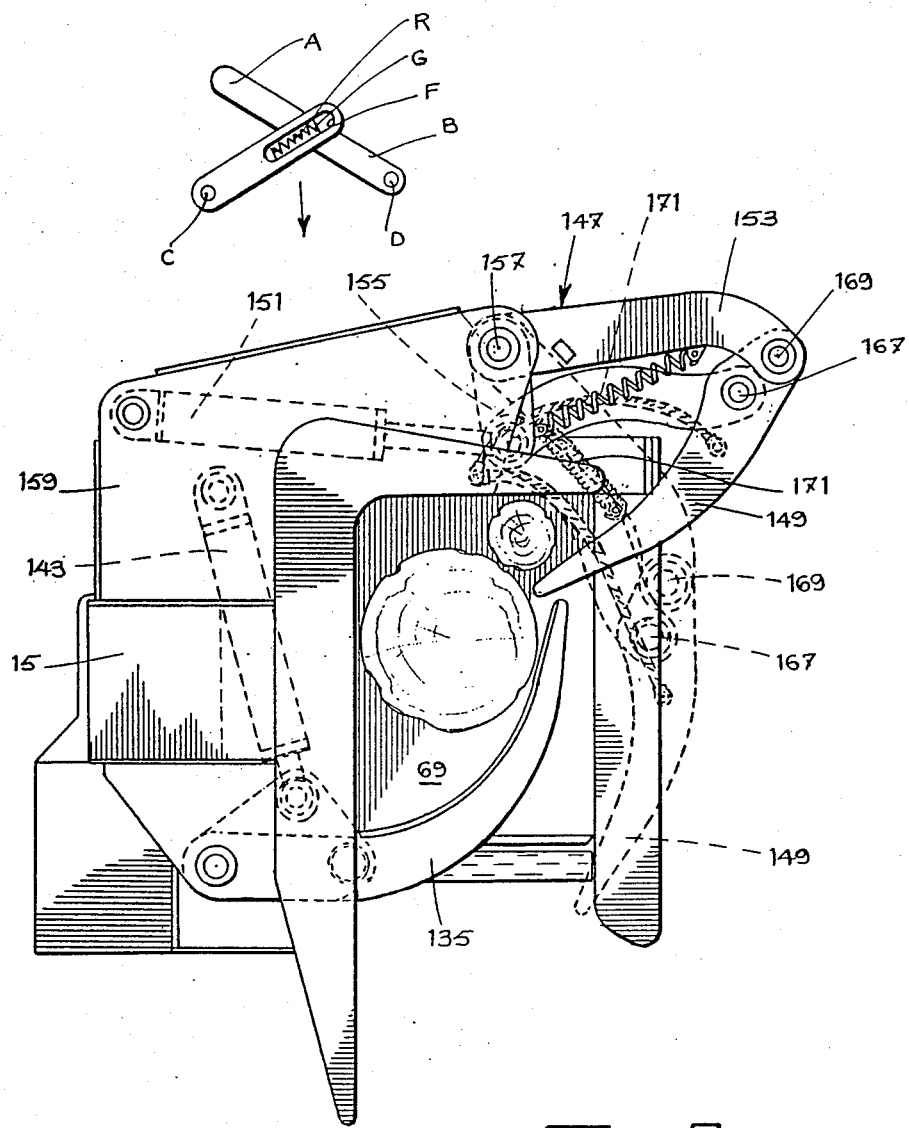
Figure 10:
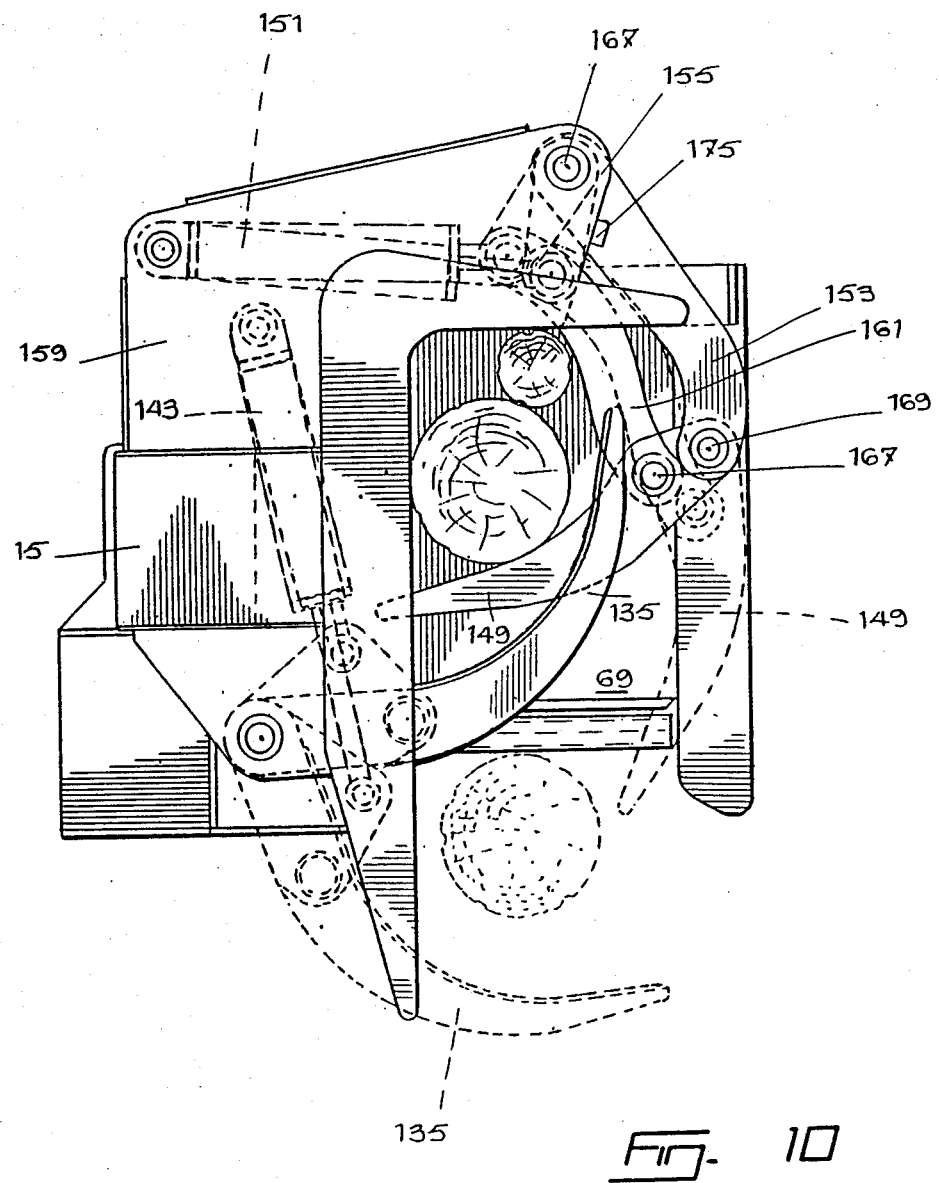

In this embodiment, the first gripping means comprise two first gripping arms 135, although one only could be envisioned. Where two arms 135 are used, they are provided on one side only of the post 15. Arms 135 are interconnected by a pair of rods 137, 139, the latter further extending past the arms 135 to be pivotally mounted on bracket 45, solid with the post 15, and on the top of the platform structure 11. The rods are joined together by a pair of triangular plates 141 and rotation in unison of the arms 135 is obtained by a power jack 143 of which the free end of the hydraulic cylinder is mounted on the post 15, in any known manner, and the free end of the rod is mounted at the apices of the plates 141. As will be gathered, operation of the jack 143 causes pivotal movement of the arms 135 in unison into and out of the enclosure 69 over the base 71, as illustrated in FIGS. 8 to 10. Since no first arms are provided on the other side of the enclosure 69, arms 135 should have an appropriate length suitable to grasp trees of various diameters and preferably a length capable of extending across essentially the full width of the enclosure bottom wall 71, as shown in FIG. 8.

In this embodiment, as in the first, the second gripping arm means 145 are operable independently of the first gripping arm means 135 to 143 and comprise a compound linkage means 14,, including a second gripping arm 149, and a power jack 151 operating the linkage means 147; the latter being constructed to act as a knuckle joint having a breaking point preferably lying outside the enclosure 69, for a purpose to be given hereinafter.

Figure 7:
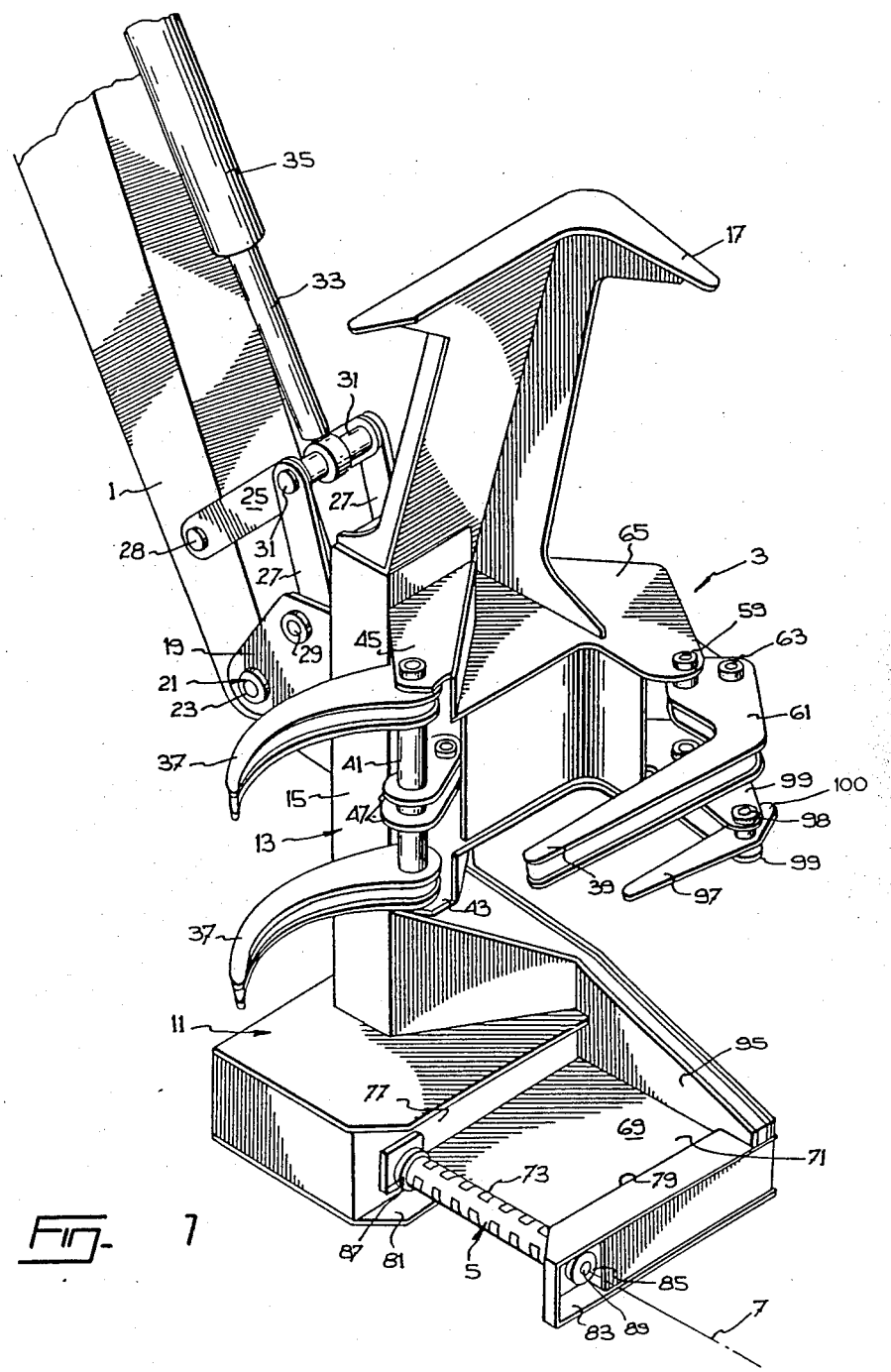
FIG. 7 is a plan view of the tree felling head, the storage enclosure being empty.

In FIG. 7, the compound linkage means 147, shown in inoperative position outside the enclosure 69, is seen to comprise a first long link 153 and a first short link 155 pivotally interconnected at adjoining ends by a first pivot joint 157 which mounts them on the post 15 through a bracket plate or plates 159 solid with the post. The linkage means 147 also includes a second long link 161 and a second short link 163; a second pivot joint 165 pivotally interconnecting one end of the second long link 161 to the other end of the first short link 155. Finally, a third pivot joint 167 pivotally interconnects the other end of the second long link 161 to one end of the second short link 163 and a fourth pivot joint 169 pivotally interconnects the remaining two ends of the links 153 and 163, respectively.

It will be noted that the second long link 161 is appreciably shorter than the first long link 153 and is located inward with respect to the storage enclosure. The second short outward link 163 is likewise preferably shorter than the first short link 155. The compound linkage means 147 thus has the general form of a pantograph; it is however trapezoidal in shape rather than having the shape of a parallelogram. Also, the outer end of link 153 bends inward over the pivot joint 167, as shown. To leave as much room as possible when the linkage means 147 is in active position (FIGS. 8 and 10), the second short link 161 should be given a somewhat sinusoidal shape.

As clearly shown, the second tree gripping arm 149 is an inward solid extension of the second short link 163. Finally, a coil spring 171 is provided which has one end secured to the first short link 155 at the end thereof having the second pivot joint 165 and the other end secured to the first long link at its end having the fourth pivot joint 169.

As aforesaid, the above described linkage means 147 is operated by the power jack 151 which has its cylinder end pivotally mounted on the post 15 through the bracket plate or plates 159.

Linkage means 147 is limited, in its outward movement, by a cable 173 of which one end is fixed to the post bracket plates 159 while the other end is fixed to the second gripping arm 149. The outward limit position is that shown in FIG. 7. It is also limited in its inward movement by an abutment block 175 on first long link 153 close to the first pivot joint 157. In the inward limit position of the linkage means 147, which is shown in FIG. 8, this block 175 lies against an edge of the post bracket plate 159.

The above described compound linkage means operate as follows, reference being had to FIGS. 8, 9 and 10.

In FIG. 8, the rod of the power cylinder of jack 151 is pulled fully within the cylinder and the limit block 175 butts against the bracket plate 159. A first tree is held in the storage enclosure 69 by the second gripping arm 149 while the first gripping arm 135, acted upon by its cylinder 143, brings in a second tree that has been cut by knife 5. Spring 171 is tensioned and keeps a pressure on the first tree.

At that moment, the jack 151 is operated in reverse and its rod moves out of its cylinder, causing counterclockwise rotation of the first short link 155, and hence of the whole linkage means, about the pivot joint 157. The second arm 149 gradually moves out of the enclosure 69 advantageously tangentially of the first and second tree (FIG. 9). Tension keeps on increasing in the spring 171 up to a point, the breaking point, where it suddenly causes pivot joint 167 to slide rightward and beneath the pivot joint 169 causing the second gripping arm 149 to straighten up, as shown in broken lines in FIG. 9, and releasing the tension in the spring. Second gripping arm 149 then stands ready to move behind the second tree (FIG. 10) to hold both trees in the enclosure 69, when the rod moves inwardly of the cylinder 151. The same procedure is repeated to bring additional trees in the storage enclosure 69. The compound linkage means thus acts somewhat like a knuckel joint and its breaking point should be located outside the enclosure 69 to allow storing as many trees a possible.

Figure 11:
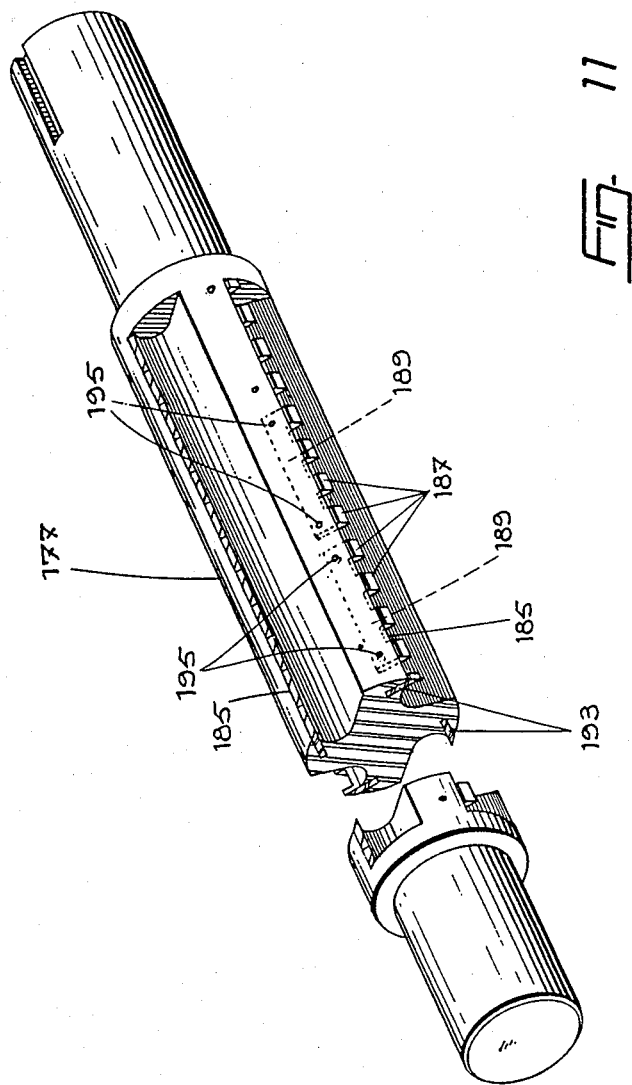
FIG. 11 is a perspective view of a preferred type of cylindrical rotary cutter.

FIG. 11 shows another preferred form of cylindrical cutting knife 177 wherein each row 185 of aligned cutting teeth 187 is obtained with a series of spaced crenelated flat plates 189, the projecting cutting edges thereof being provided at the tips of the crenels. The plates 189 are lodged in appropriate continuous grooves 193 made through the knife body along the rows 185 and set into place by a series of screws 195. In this manner, any worn out teeth may be sharpened or replaced simply by removing the corresponding plate or plates 189.

What is claimed is:

1. A tree harvester comprising:
   a head boom having a lower free end;
   a tree felling head comprising an elongated post having a longitudinal axis and a platform structure fixedly mounted at one end of said post and extending laterally therefrom; said platform structure defining a storage enclosure including a flat bottom wall having a straight front edge and a circumscribing wall upstanding from and around said bottom wall, said circumscribing wall extending at least up to the ends of said straight front edge;
   a rotary cylindrical cutting knife and means solidly mounting said knife on said platform structure immediately adjacent and parallel to said bottom wall front edge outside said storage enclosure, said cylindrical knife having a top longitudinal edge essentially flush with the top face of said bottom wall;
   means pivotally mounting said post on said lower end of said head boom for holding said tree felling head with said rotary cutting knife in essentially horizontal position and applied against one side of a butt end of a tree to be felled;
   first gripping arm means comprising at least one first gripping arm storage enclosure and adjacent thereto; means mounting one end of said first arm on said tree felling head for pivotal movement of said first arm about an axis parallel to said post longitudinal axis, and first power means for pivoting said first gripping arm along an arc of circle of sufficient length to allow said first arm to close in around the other side of said butt end of the tree to be felled whereby to press said rotary cutting knife against the tree butt end to cut a kerf thereacross and thereafter to move said tree into said storage enclosure in vertical position against said circumscribing wall;
   a tree support fixed to said post avoce at least part of said circumscribing wall for holding said cut tree in said vertical position; and
   second gripping arm means for releasably holding said felled tree in said storage enclosure while a further tree is being felled, said second gripping arm means being operative independently of said first gripping arm means and comprising a compound linkage means, including a second gripping arm, and a power jack operating said compound linkage means;
   wherein said compound linkage means is constructed to act as a knuckle joint and comprises:
      a first long link and a first short link; first pivot means pivotally interconnecting said first link at adjoining ends thereof and pivotally mounting said links at said adjoining ends on said post for pivotal movement about an axis parallel to said post longitudinal axis;
      a second long link and a second short link; second pivot means pivotally interconnecting one end of said second long link to the end of said first short link away from said first pivot means; third pivot means pivotally interconnecting the other end of said second long link to one end of said second short link, and fourth pivot means pivotally interconnecting the other end of said second short link to the other end of said first long link;
      wherein said second long link is shorter than said first long link and is located inward with respect to said storage enclosure;
      wherein said second tree gripping arm is an inward solid extension of said second short link past said third pivot means;
      a coil spring having one end secured to said first short link at the end thereof having said second pivot means and the other end secured to said first long link at the end thereof having said fourth pivot means; and
   wherein said power jack used for operating said compound linkage means has one end pivotally mounted on said post and the other end pivotally mounted on said first short link at the end thereof having said second pivot means.

2. A tree harvester as claimed in claim 1, wherein said first gripping arm means comprise two spaced first gripping arms, on one side of said post longitudinal axis; wherein said first power means comprise a single power jack pivoting said two arms in unison and wherein said first gripping arm means additionally comprise at least one further first gripping arm located on the other side of said post longitudinal axis between said two spaced first gripping arms on said one side whereby to embrace a tree to be cut from two opposite sides thereof, and wherein said first power means comprise a further power jack pivoting said further first gripping arm.

3. A tree harvester as claimed in claim 2, wherein said second gripping arm means are located on said other side of said post longitudinal axis and between said two spaced first gripping arms on said one side of said post longitudinal axis.

4. A tree harvester as claimed in claim 3, wherein said second gripping arm means are located between said further first gripping arm and said storage enclosure.

5. A tree harvester as claimed in claim 1, wherein said bottom wall is rectangular and said straight front edge extends fully along one said thereof.

6. A tree harvester as claimed in claim 1, wherein said circumscribing wall comprises two sidewalls having ends projecting forwardly of said bottom wall frontal edge, and said knife mounting means comprise bearing means in said side wall projecting ends into which the ends of said cylindrical cutting knife are mounted.

7. A tree harvester as claimed in claim 6, comprising cutting knife rotary power means operatively connected to one of said ends of said knife.

8. A tree harvester as claimed in claim 1, wherein said cylindrical cutting knife comprises a plurality of rows of aligned cutting teeth, said rows extending parallel to said rotation axis and being evenly spaced around said cylindrical cutting knife.

9. A tree harvester as claimed in claim 8, wherein the teeth of each of said rows are staggered with the teeth of adjacent rows, lengthwise of said cutting knife.

10. A tree harvester as claimed in claim 1, wherein said flat bottom wall has a thickness not exceeding the diameter of said cylindrical cutting knife.

11. A tree harvester as claimed in claim 1, wherein said compound linkage means are constructed to act as a knuckle joint having a breaking point located outside of said storage enclosure.

12. A tree harvester as claimed in claim 1, further comprising a cable for limiting outward movement of said compound linkage means, said cable having one end secured to said post and the other end secured to said second gripping arm adjacent said third pivot means.

13. A tree harvester as claimed in claim 12, further comprising abutment means on said first long link adjacent said first pivot means and on said post for limiting inward movement of said compound linkage means.

14. A tree harvester as claimed in claim 1, wherein said first gripping arm means comprise two first gripping arms, on one side of said post longitudinal axis, and wherein said power jack means comprise a single power jack pivoting said two arms in unison.

15. A tree harvester as claimed in claim 3, wherein said compound linkage means are constructed to act as a knuckle joint having a breaking point located outside of said storage enclosure.

16. A tree harvester as claimed in claim 8, wherein each of row of aligned cutting teeth is formed by spaced crenelated flat plates lying in common parallel planes and lodged in uninterrupted outwardly open grooves made lengthwise of said cutting knife, screw means releasably securing said plates in said grooves and said cutting teeth being defined by the tips of the crenels of said plates.

17. A tree harvester as claimed in claim 1, wherein said second short link of said compound linkage means is shorter than said first short link.

18. A tree harvester as claimed in claim 1, wherein said first long link bends over said third pivot means.

* * * * *